Patented Dec. 20, 1938

2,140,668

UNITED STATES PATENT OFFICE 2,140,668

PROCESS FOR MAKING ZINC SULPHIDE

Harlan A. Depew and William T. Maidens, Columbus, Ohio, assignors to American Zinc, Lead & Smelting Company, St. Louis, Mo., a corporation of Maine No Drawing. Application September 19, 1934, Serial No. 744,739

8 Claims. (Cl. 23—135)

This invention relates to a process for making zinc sulphide and the product produced thereby, and more particularly to that form of zinc sulphide known as wurtzite. As commonly made by wet methods, zinc sulphide pigments are composed essentially of sphalerite with some wurtzite as an impurity, the wurtzite being regarded as injurious, but so far as we are informed, no zinc sulphide that is essentially wurtzite has ever been produced.

One of the objects of the present invention is to produce a zinc sulphide pigment that is essentially wurtzite. By the term "pigment" as herein used is meant a product of a fineness sufficient to enable it to be used as a pigment in paint. Another object is to produce a zinc sulphide of acicular form. A further object is to obtain a zinc sulphide of superior whiteness that will contain a minimum of free sulphur and zinc oxide. The acicularity of the wurtzite produced by the present invention results in extremely high oil absorption.

In U. S. Patent No. 1,963,546, granted June 19, 1934, to Harlan A. Depew, there is set forth a process for making zinc sulphide by which zinc is volatilized in the presence of an inert gas, which inert gas, together with the zinc vapor, is conveyed into contact with sulphur vapor in a reaction zone in which the temperature is held preferably at from 700° C. to 800° C., higher temperature being avoided as liable to form undesirable impurities on the surface of the zinc oxide particles.

We have discovered that when zinc vapor and an inert carrying gas, such as zinc vapor carried in CO, $CO_2$ and $N_2$, is introduced into a reaction zone with sulphur vapor at a time when the zinc vapor is heated to a high temperature (above 1060° C. and even as high as 1200° C.–1300° C., or even 1600° C.), a very superior form of zinc sulphide is obtained that is essentially wurtzite and which can be crystallized as needles. By our process wurtzite has been produced which analyzed 99.6% ZnS, 0.2% ZnO and 0.2% free sulphide. The acicularity of this wurtzite results in extremely high oil absorption. Preferably the carrying gas employed should be one that will react with any ZnO present to form metallic zinc, and also which will react with sulphur more slowly than the zinc and thereby remove a large part of any excess free sulphur that may be introduced into the reaction zone.

Conditions under which the acicular or needle-shaped form of zinc sulphide can be obtained may be varied. For example, 600 cubic feet of air per minute was blown through an anthracite gas producer to form a gas that analyzed 74% nitrogen, 13% CO and 13% $CO_2$. Zinc vapor was evaporated into this gas at the rate of 11 pounds per hour, and the zinc-bearing gas was heated to 1300° C. and sulphur was added at the rate of 10 pounds per hour, allowing the gases to mix lazily. Acicular wurtzite formed that analyzed 99.6% ZnS, 0.2% ZnO and 0.2% free sulphur. Wide variations can be made in the above conditions and still an acicular zinc sulphide produced, as will be understood by those skilled in the art. The reaction generates heat and the temperature in the combustion chamber will necessarily depend in part on the concentration of the zinc vapor.

Under the microscope this acicular zinc sulphide (wurtzite) has the same appearance as acicular zinc oxide. This is not surprising since wurtzite and zinc oxide crystallize in the same pattern. Under other conditions of furnace operation, wurtzite has only a slight acicularity, and in still other cases takes the approximate form of round particles. In other words, this zinc sulphide (wurtzite) can be crystallized in a series of patterns similar to zinc oxide, because they both have the same crystal structure.

The maximum temperature that can be used in the practice of this process is determined by the life of the refractories used in the construction of the furnace—1400° C., 1500° C. or even 1800° C.

Any suitable means of introducing the zinc vapor into the reaction zone may be employed. The sulphur may be melted and then heated in any suitable way to a temperature sufficient to vaporize it, and the vapor then conducted into the presence of the zinc vapor and carrying gases, the latter, of course, being heated to the desired temperature which should be not less than 1060° C., and preferably should be 1200° C. to 1300° C., or higher.

If desired, the sulphur may be fed into a suitable chamber where it is melted and the molten sulphur atomized into the reaction zone; or the temperature may be raised until the melted sulphur is vaporized and the vapor then conducted into the reaction zone by metering or otherwise. Any suitable means may be employed for raising the zinc vapor and the carrying gases to the desired temperature. For example, the zinc vapor and the carrying gases, at a temperature of from 700° C. to 900° C., may be passed through a highly heated checker-work chamber and heated to a temperature of say 1400° C. and passed therefrom to the reaction zone at a temperature of from 1200° C. to 1300° C., where the sulphur vapor is introduced; or, the zinc vapor and carrying gases may be passed into a suitable conduit or chamber at a temperature say from 700° C. to 900° C. and preheated air and reducing gases passed simultaneously through a checker-work into said chamber or conduit at a temperature of say 1500° C. and passed thence to the reaction zone where the sulphur vapor is introduced; or again the zinc vapors and gases may be passed through a suitable conduit or chamber containing an electrical coil or arc which serves to raise the temperature of said vapor and gases to say 1200° C. to 1300° C., and thence to the reaction zone where the sulphur vapor is introduced. The ground sulphur may be placed in a suitable hopper and advanced therefrom at a uniform rate by means of a motor-driven screw to a vertical column through which it drops into a suitable container that can be of circular or angular cross section, which container is heated by a furnace to a temperature sufficiently high to first melt and then vaporize the sulphur, after which the sulphur vapor escapes through openings into the reaction zone. Or the sulphur may be vaporized and the vapor, under a definite pressure, may be metered through an orifice into the reaction zone or otherwise supplied thereto.

The gas, ($CO$, $CO_2$), zinc vapor and nitrogen can be obtained, if desired, directly from ore, using a Wetherill grate or any of the other standard furnaces that produce zinc vapor in the presence of inert gas, and the gas and vapor thus formed can have the temperature raised to the desired degree by passing the same through an externally heated retort or by any other suitable method, such as heretofore described.

When the process is practiced as hereinbefore described, it will be found that the zinc sulphide may be crystallized as needles, like zinc oxide, but these needles are not the ordinary zinc sulphide known as sphalerite, but are light-proof wurtzite. Heretofore it has been believed that wurtzite in zinc sulphide is the cause of light sensitivity and that the amount of wurtzite increases as the muffling temperature increases and that simultaneously the light sensitivity increases. On the contrary, when the wurtzite of the present invention is muffled at a temperature of approximately 900° C. the light sensitivity is very little injured. Accordingly, under the present invention, wurtzite is sometimes muffled at a temperature of approximately 900° C. If it is muffled at a low temperature, say from 400° C. to 500° C., the light sensitivity thereof is lowered. That is, the effect of muffling on the wurtzite of the present invention is the opposite of the effect on sphalerite or ordinary zinc sulphide.

We have been inclined to believe that some of the wurtzite made according to this invention changed to sphalerite on muffling at low temperatures and made the product more light sensitive through an interaction between wurtzite and sphalerite. X-ray measurements show no sphalerite formed on muffling, but this is not significant inasmuch as X-ray measurements are not sensitive and appreciable amounts of sphalerite could exist especially in a disperse condition without appearing in the X-ray pattern. Although we believe the formation of some sphalerite may be the explanation of the strange muffling behaviour, we do not care to be limited to this explanation. Whatever the correct explanation may be, the fact is that this zinc sulphide behaves differently on muffling from that made by U. S. Patent No. 1,963,546 and the other generally accepted methods.

In practicing the present invention, the wurtzite, after being formed, should be cooled as rapidly as possible to a low temperature through the injurious range around 400° C.–500° C. This can be accomplished by wet collection or by adding a cooling inert gas.

Out of 230 possible space diagrams, wurtzite crystallizes in the same diagram as zinc oxide. Not only is the type of crystal the same but the unit cell dimensions as determined by X-rays is nearly identical. From this it follows that zinc oxide will go into solid solution in wurtzite. Heretofore wurtzite has been regarded as unstable, whereas the wurtzite of the present invention is relatively stable, and it appears that it has been stabilized by the zinc oxide. Not only has wurtzite been regarded as unstable, but it has been recognized that it changes to sphalerite on grinding. In contrast to this, the wurtzite of the present invention, after ball-milling over night is still stable to light, and this stabilization we believe to be due to the trace of zinc oxide that must be in solid solution. Heretofore it has not been thought possible to grind wurtzite to pigment form, but the wurtzite of the present invention may be so ground and still be stable to light. By "stable to light" or "light stable", as herein used is meant that when the zinc sulphide is tested by the well-known Breyer, Nelson & Farber method, it will show no appreciable darkening upon exposure for five (5) minutes to the light rays of the mercury arc of said method.

Because of the acicular form of the wurtzite of the present invention it gives superior wear in outside paints over ordinary round particle zinc sulphide.

While the transition temperature of the sphalerite to wurtzite is 1020° C. +5° and up, we have found that in order to obtain the best color and superior reducing conditions, the temperature in the reaction zone should be from 1200° C. and upward. Excellent results have been obtained at 1350° C. and 1400° C.

By the expression "inert gas" as herein used, is meant one that is reducing to any zinc oxide in the zinc vapor and which will not be sufficiently reactive with sulphur to prevent the zinc-sulphur reaction from proceeding to completion with a small added excess of sulphur but which will be sufficiently reactive to remove any large excess of free sulphur. The products of combustion of coal are satisfactory for this inert gas, it being understood, of course, that the $CO$—$CO_2$ ratio permissible depends on the temperature. With equal parts of $CO$ and $CO_2$, such a mixture may be somewhat oxidizing to zinc at low temperature, but will be suitably reducing at a temperature of 1200° C. The gases will react, however, with excess sulphur and limit the amount of free sulphur in the finished product and will react with free zinc oxide to lower the amount to a very small percentage.

Having thus described the invention, what is claimed is:

1. The process of making zinc sulphide which consists in introducing zinc vapor and an inert carrying gas and also sulphur into a reaction zone, and maintaining the zinc vapor and carrying gas at a temperature above 1060° C.

2. The process of making zinc sulphide which consists in introducing zinc vapor and an inert carrying gas and also sulphur into a reaction zone, and maintaining the zinc vapor and carrying gas at a temperature above 1060° C., the carrying gas being one that will react with zinc oxide to form metallic zinc and also react with sulphur more slowly than with zinc.

3. The process of making wurtzite which consists in passing air through an anthracite gas producer to produce a mixture of inert gases consisting of nitrogen, carbon monoxide and carbon dioxide, introducing zinc vapor into said mixture, and then introducing sulphur into the zinc-bearing inert gas when the latter is at a temperature above 1100° C.

4. The process of making zinc sulphide which consists in introducing sulphur, zinc vapor and a reducing carrying gas containing carbon monoxide into a reaction zone when the zinc vapor is heated above 1060° C.

5. The process of making zinc sulphide which consists in mixing sulphur with zinc vapor and a reducing gas that will react with any zinc oxide present to form metallic zinc, the zinc vapor being heated above 1100° C.

6. The method of making zinc sulphide which consists in vaporizing zinc, mixing the zinc vapor with an inert carrying gas, and maintaining the temperature of the mixture above 1060° C. while introducing sulphur into the mixture.

7. The method of making zinc sulphide which consists in vaporizing zinc, mixing the zinc vapor with an inert carrying gas, and maintaining the temperature of the mixture above 1060° C. while introducing sulphur into the mixture, whereby wurtzite is produced, and then muffling the same at a temperature of approximately 900° C.

8. As a new product, acicular zinc sulphide pigment crystallized in the ZnO pattern and containing zinc oxide but in an amount less than 1% and made by introducing zinc vapor and an inert carrying gas and sulphur into a reaction zone while maintaining the zinc vapor and carrying gas at a temperature above 1060° C.

HARLAN A. DEPEW.
WILLIAM T. MAIDENS.